United States Patent
Chung et al.

(10) Patent No.: US 7,047,552 B2
(45) Date of Patent: May 16, 2006

(54) VIDEO APPARATUS HAVING VARIABLE OSD GRAPHIC DATA AND A METHOD THEREFOR

(75) Inventors: Min-hyung Chung, Suwon (KR); Yeon-taek Han, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 909 days.

(21) Appl. No.: 09/780,615

(22) Filed: Feb. 12, 2001

(65) Prior Publication Data

US 2002/0054065 A1    May 9, 2002

(30) Foreign Application Priority Data

Feb. 14, 2000    (KR)    ................... 2000-6835

(51) Int. Cl.
  *H04N 7/16*    (2006.01)
(52) U.S. Cl. .................. 725/142; 725/37; 345/716
(58) Field of Classification Search ............... 386/26, 386/34; 725/37–61, 151–153; 345/716
  See application file for complete search history.

(56) References Cited

U.S. PATENT DOCUMENTS

| | | | | |
|---|---|---|---|---|
| 5,181,113 A | * | 1/1993 | Chang | 348/468 |
| 5,418,903 A | * | 5/1995 | Lee | 345/581 |
| 5,579,057 A | * | 11/1996 | Banker et al. | 348/589 |
| 5,623,316 A | * | 4/1997 | Naito et al. | 348/569 |
| 5,686,954 A | * | 11/1997 | Yoshinobu et al. | 725/43 |
| 5,721,593 A | | 2/1998 | Suh | |
| 5,818,935 A | * | 10/1998 | Maa | 380/200 |
| 6,002,394 A | * | 12/1999 | Schein et al. | 725/39 |
| 6,141,002 A | | 10/2000 | Kanungo et al. | 345/327 |
| 6,226,047 B1 | * | 5/2001 | Ryu | 348/569 |
| 6,311,329 B1 | * | 10/2001 | Terakado et al. | 725/44 |
| 6,317,141 B1 | * | 11/2001 | Pavley et al. | 345/732 |
| 6,570,990 B1 | * | 5/2003 | Kohn et al. | 380/213 |
| 6,580,462 B1 | * | 6/2003 | Inoue et al. | 348/460 |
| 6,628,831 B1 | * | 9/2003 | Needham | 382/168 |
| 6,694,200 B1 | * | 2/2004 | Naim | 700/94 |
| 2002/0112180 A1 | * | 8/2002 | Land et al. | 713/200 |

FOREIGN PATENT DOCUMENTS

| | | |
|---|---|---|
| EP | 0 818 925 | 1/1998 |
| EP | 0 933 940 | 8/1999 |
| WO | WO 98/48571 | 10/1998 |

OTHER PUBLICATIONS

Robinson, David E. and David Grubb III, "A High-Quality Switched Video System", IEEE LCS Magazine, Feb. 1990, pp. 53-59.*

* cited by examiner

*Primary Examiner*—Vivek Srivastava
(74) *Attorney, Agent, or Firm*—Staas & Halsey LLP

(57) ABSTRACT

A video apparatus having variable OSD (on-screen display) graphic data and a method therefor. The video apparatus receives or downloads OSD graphic data from an external OSD graphic data source, to enable a user to alter the OSD display data without having to store a large number of different types of OSD display data. The video apparatus may be a television receiver set, a web television receiver set, a web video camera or some other video appliance.

38 Claims, 6 Drawing Sheets

VIDEO APPARATUS HAVING VARIABLE OSD GRAPHIC DATA AND A METHOD THEREFOR

CROSS-REFERENCE TO RELATED APPLICATIONS

This application claims the benefit of Korean Application No. 00-6835, filed Feb. 14, 2000, in the Korean Patent Office, the disclosure of which is incorporated herein by reference.

BACKGROUND OF THE INVENTION

1. Field of the Invention

The present invention relates to a video apparatus having variable OSD graphic data and a method therefor, and more particularly, to a video apparatus for receiving or downloading OSD graphic data from an external OSD graphic data source and varying an OSD display in a variety of user desired display forms. A variety of the OSD displays may be fonts of different language, different signs, symbols such as '+,' '−,' etc.

2. Description of the Related Art

Video apparatuses such as a television, a video cassette recorder and a video camera possess an OSD function. To perform the OSD function, an OSD font ROM is included in a video apparatus. An RGB OSD signal is read from the font ROM in response to a font ROM addressing corresponding to display data and the read RGB OSD signal is overlapped with a video signal, to then be displayed on a screen.

However, in the case of the above existing font ROM type OSD function, OSD data is stored in a font ROM and then provided to a user. Accordingly, the user cannot change an OSD display at his or her will. Thus, the same OSD is always displayed for any particular model or maker of a video apparatus.

In order to accomplish various OSD displays, a variety of OSD font data should be stored in the font ROM, which causes a high degree of inefficiency considering cost versus frequency in use of the OSD function.

SUMMARY OF THE INVENTION

To solve the above problems, it is an object of the present invention to provide a video apparatus for receiving or downloading OSD graphic data externally and performing an OSD graphic display in various forms.

Additional objects and advantages of the invention will be set forth in part in the description which follows and, in part, will be obvious from the description, or may be learned by practice of the invention.

To accomplish the above and other objects of the present invention, there is provided a television receiver set comprising a receiver receiving a television signal and outputting a composite video signal; a video processor processing the composite video signal and overlapping the processed video signal and an OSD graphic signal, to thereby output a display video signal; a data detector detecting OSD graphic data from the composite video signal; a memory storing the detected OSD graphic data; and a controller storing the OSD graphic data detected from the data detector in the memory in response to an OSD graphic data storage signal and reading corresponding OSD graphic data from the memory in response to an OSD display signal, to supply the read OSD graphic data to the video processor.

There is also provided a web television receiver set comprising a receiver receiving a television signal and outputting a composite video signal; a video processor processing the composite video signal and overlapping the processed video signal and an OSD graphic signal, to thereby output a display video signal; a modem connected to a communication network, downloading OSD graphic data from an external OSD graphic data source; a memory storing the OSD graphic data downloaded via the modem; and a controller storing the OSD graphic data downloaded via the modem in the memory in response to an OSD graphic data downloading signal and reading corresponding OSD graphic data from the memory in response to an OSD display signal, to supply the read OSD graphic data to the video processor.

There is also provided a web video camera apparatus comprising a camera picking up an image; a video processor processing the pickup image and overlapping the processed video signal and an OSD graphic signal, to thereby output a display video signal; a modem connected to a communication network, downloading OSD graphic data from an external OSD graphic data source; a memory storing the OSD graphic data downloaded via the modem; a deck recording the display video signal on a video recording medium; and a controller storing the OSD graphic data downloaded via the modem in the memory in response to an OSD graphic data downloading signal and reading corresponding OSD graphic data from the memory in response to an OSD display signal, to supply the read OSD graphic data to the video processor.

BRIEF DESCRIPTION OF THE DRAWINGS

The above object and other advantages of the present invention will become more apparent by describing the preferred embodiments thereof in more detail with reference to the accompanying drawings in which.

DETAILED DESCRIPTION

Figure 1:
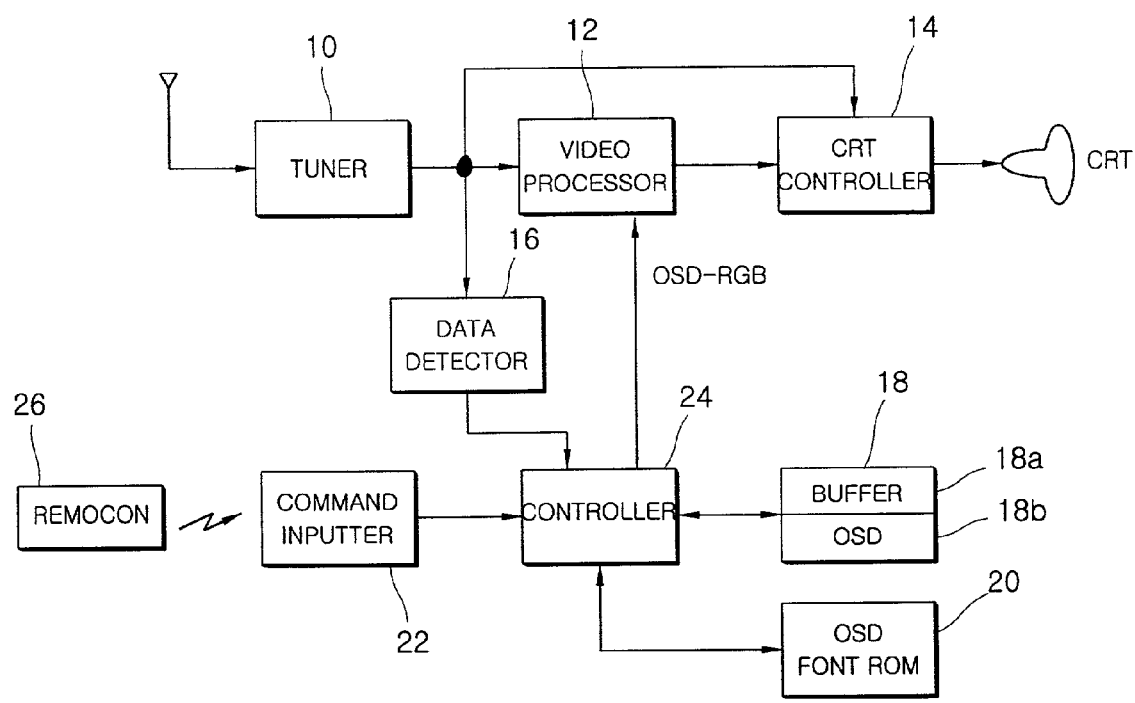
FIG. 1 is a block diagram showing a television receiver set having variable OSD graphic data according to the present invention.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

In FIG. 1, a television receiver set includes a tuner 10, a video processor 12, a CRT controller 14, a data detector 16, a memory 18, an OSD font ROM 20, a command inputter 22 and a controller 24.

The tuner 10 receives a television signal of a channel selected via an antenna and demodulates the received television signal, to then output a composite video signal.

The video processor 12 receives the composite video signal and processes it into luminance and chrominance signals, to then output an RGB video signal. Also, the video processor 12 receives an OSD-RGB signal provided from the controller 24 and overlaps it with the received RGB video signal, for outputting an overlapped resultant signal.

The CRT controller 14 detects a sync signal from the composite video signal and displays the RGB video signal on a CRT in response to the detected sync signal.

The data detector 16 receives the composite video signal, detects data loaded in the twenty-first line of a vertical blanking interval, decodes the detected data, and provides OSD graphic data to the controller 24. Here, the OSD graphic data is provided from a broadcasting station on the basis of an additional information format of a closed caption mode. The user may find the information regarding different types of OSD graphic data through the television screen (CRT) such as in an electronic program guide (EPG), in the newspaper, etc.

The memory 18 may be any type of memory, and may include at least one of a RAM, an SRAM, an EEPROM, and a DRAM. The buffer region 18a preferably comprises a volatile memory such as a DRAM, in which the received OSD graphic data is temporarily stored. The OSD graphic data stored in the buffer region 18a is stored in the OSD region 18b according to a replacement command (signal). The replacement command is one in which, when the user wants to display the OSD graphic data stored in the buffer region 18a, the OSD graphic data is to be transferred from the buffer region 18a to the OSD region 18b in order to use and display the OSD graphic data on the CRT. It is preferable that the OSD region 18b comprises a non-volatile memory such as an EEPROM. The data stored in the OSD region 18b is provided to the system as the OSD graphic data at a user mode. The user mode is a mode in which the user selects the OSD graphic data in the OSD region 18b instead of the OSD graphic data in the OSD font ROM 20.

The OSD font ROM 20 is substantially the same as an existing OSD font ROM, which can be provided as a basic option.

The command inputter 22 includes a key input device on a front panel of the television receiver set, or a remote controller receiver receiving a remote control signal from a remote controller 26.

The controller 24 includes a microcomputer and peripheral circuits therefor. The controller 24 controls the whole system, and performs programs as shown in FIGS. 2 and 3.

Figure 2:
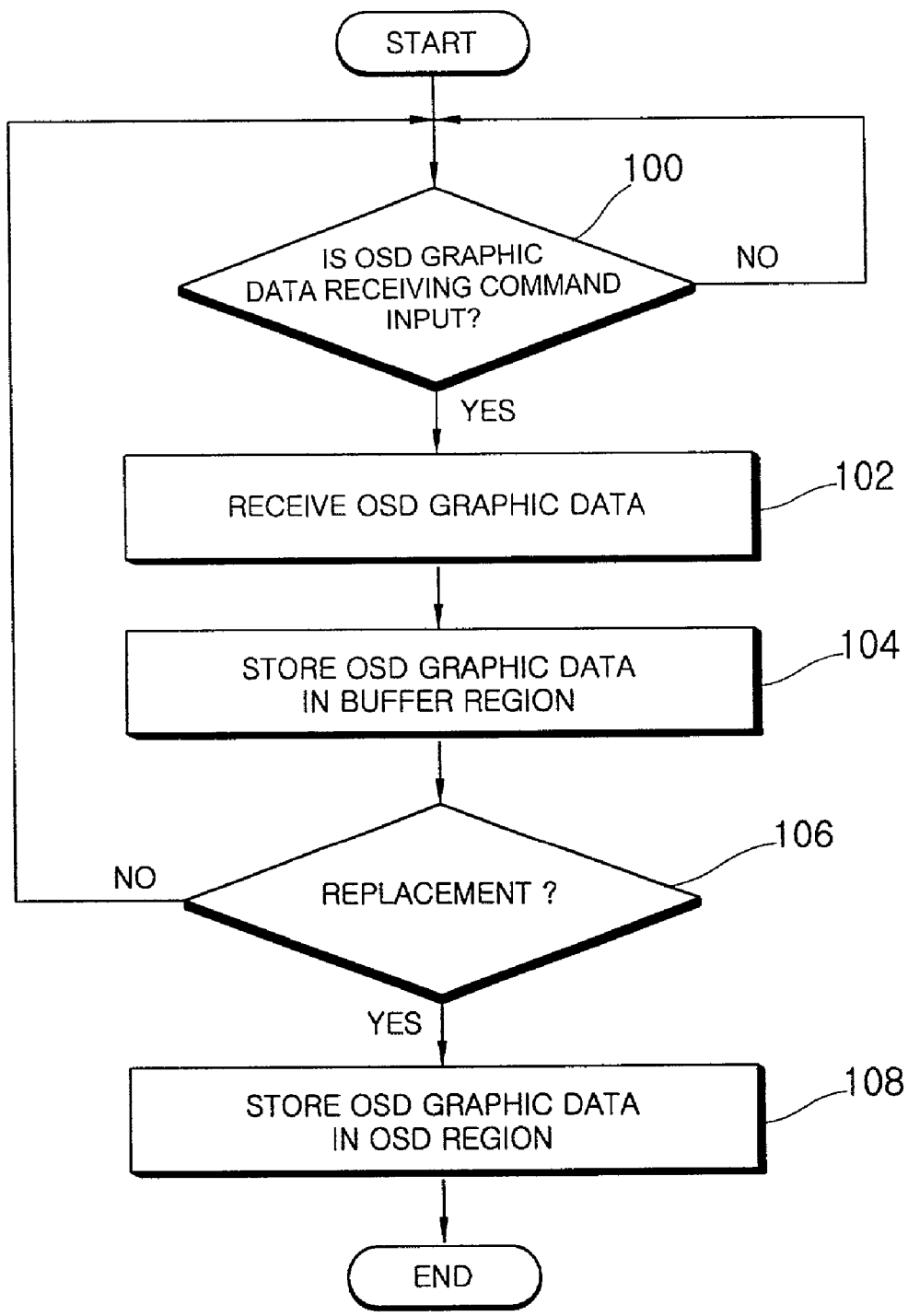
FIG. 2 is a flowchart view for explaining a program for receiving OSD graphic data according to the present invention.
Figure 3:
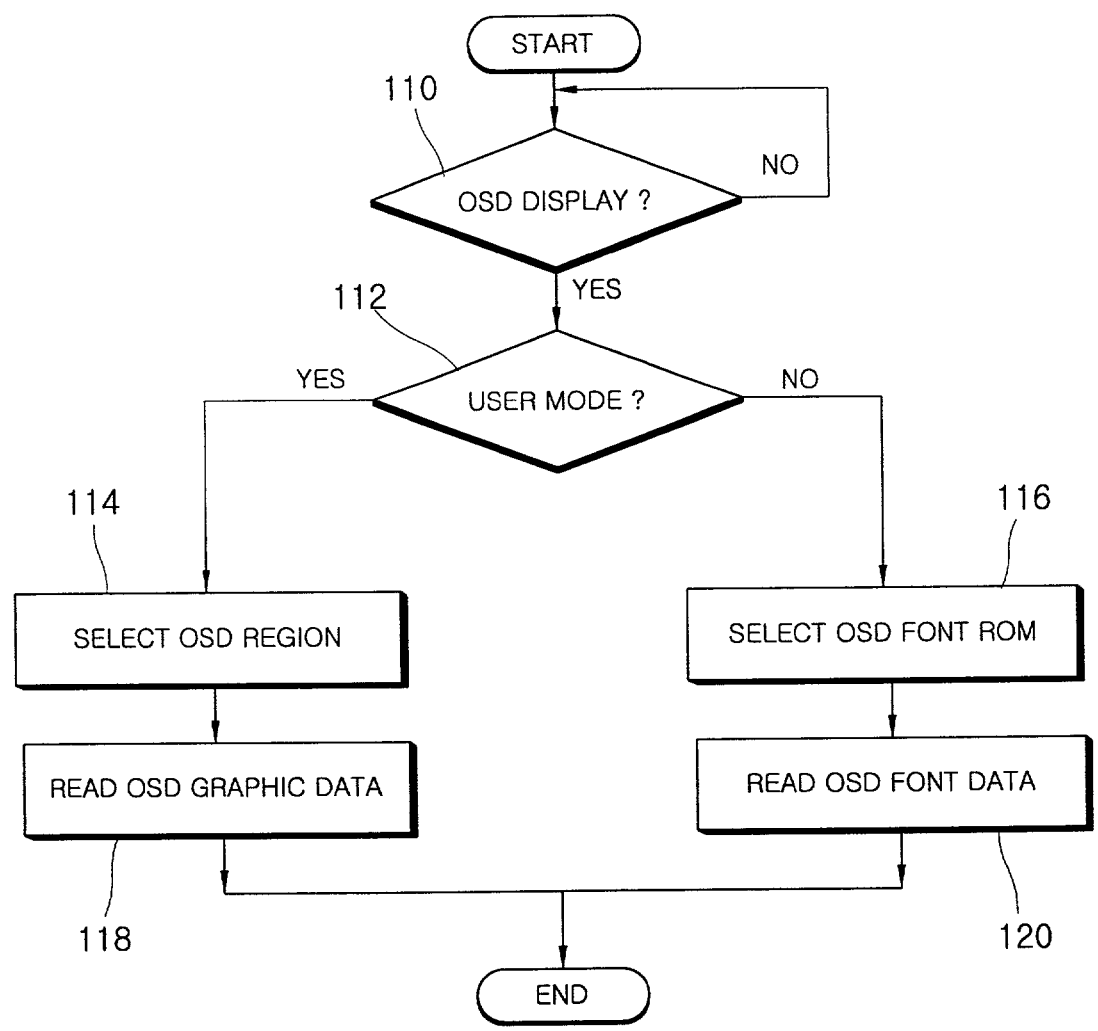
FIG. 3 is a flowchart explaining a program for displaying OSD graphic data according to the present invention.

FIG. 2 is a flowchart view for explaining a program for receiving OSD graphic data according to the present invention. The controller 24 checks whether an OSD graphic data receiving command signal is received via the command inputter 22 (operation 100). The OSD graphic data receiving command is one in which, when the user wants to store the OSD graphic data provided from the broadcasting station, the OSD graphic data is received temporarily in the buffer region 18a from the broadcasting station. If the OSD graphic data receiving command does not exist in operation 100, the controller 24 continues to check whether an OSD graphic data receiving command is received via the command inputter 22 until it is received. If the OSD graphic data receiving command exists, a channel of a broadcasting station which provides the OSD graphic data is selected via the tuner 10. The selected broadcasting signal is received and OSD graphic data is detected from the received composite video signal via the data detector 16 (operation 102). The controller 24 receives the detected OSD graphic data and temporarily stores the received OSD graphic data in the buffer region 18a of the memory 18 (operation 104). When a set of the OSD graphic data has been completely received, the controller 24 displays on a CRT an OSD signal that reception by the television receiver set of the OSD graphic data has been completed.

The controller 24 checks whether a replacement command is input via the command inputter 22 (operation 106). If the replacement command has been input, the OSD graphic data stored in the buffer region 18a is stored in the OSD region 18b (operation 108) and then the controller 24 completes the program. If the replacement command has not been input in operation 106, the controller 24 returns to operation 100, to then check whether an OSD graphic data receiving command is received via the command inputter 22.

Through the above operation, the OSD graphic data for the user mode is received from an external OSD graphic data source in the system.

FIG. 3 is a flowchart explaining a program for displaying OSD graphic data according to the present invention.

The controller 24 checks whether or not an OSD signal is displayed (operation 110). If an OSD signal has been displayed, the controller 24 checks whether a current mode is a user mode (operation 112). If an OSD signal has not been displayed in operation 110, the controller 24 continues to check whether an OSD signal is displayed. If the current mode is the user mode in operation 112, the OSD region 18b of the memory 18 is selected (operation 114), and OSD data to be displayed is read from the OSD region 18b (operation 118).

If the current mode is not the user mode in operation 112, the OSD font ROM 20 is selected (operation 116) and OSD data to be displayed is read from the OSD font ROM 20 (operation 120).

The read OSD data is provided to the video processor 12 and then overlapped with the received composite video signal to then be displayed on the CRT.

The OSD graphic data stored in the OSD region 18b may be supplied in an RGB pattern from the broadcasting station and stored in the OSD region 18b in the RGB pattern. Otherwise, the OSD graphic data may be supplied in a binary code or a hexadecimal code form from the broadcasting station, converted into an RGB pattern by a code conversion program by the controller 24 and the converted RGB pattern is finally stored in the OSD region 18b.

Figure 4:
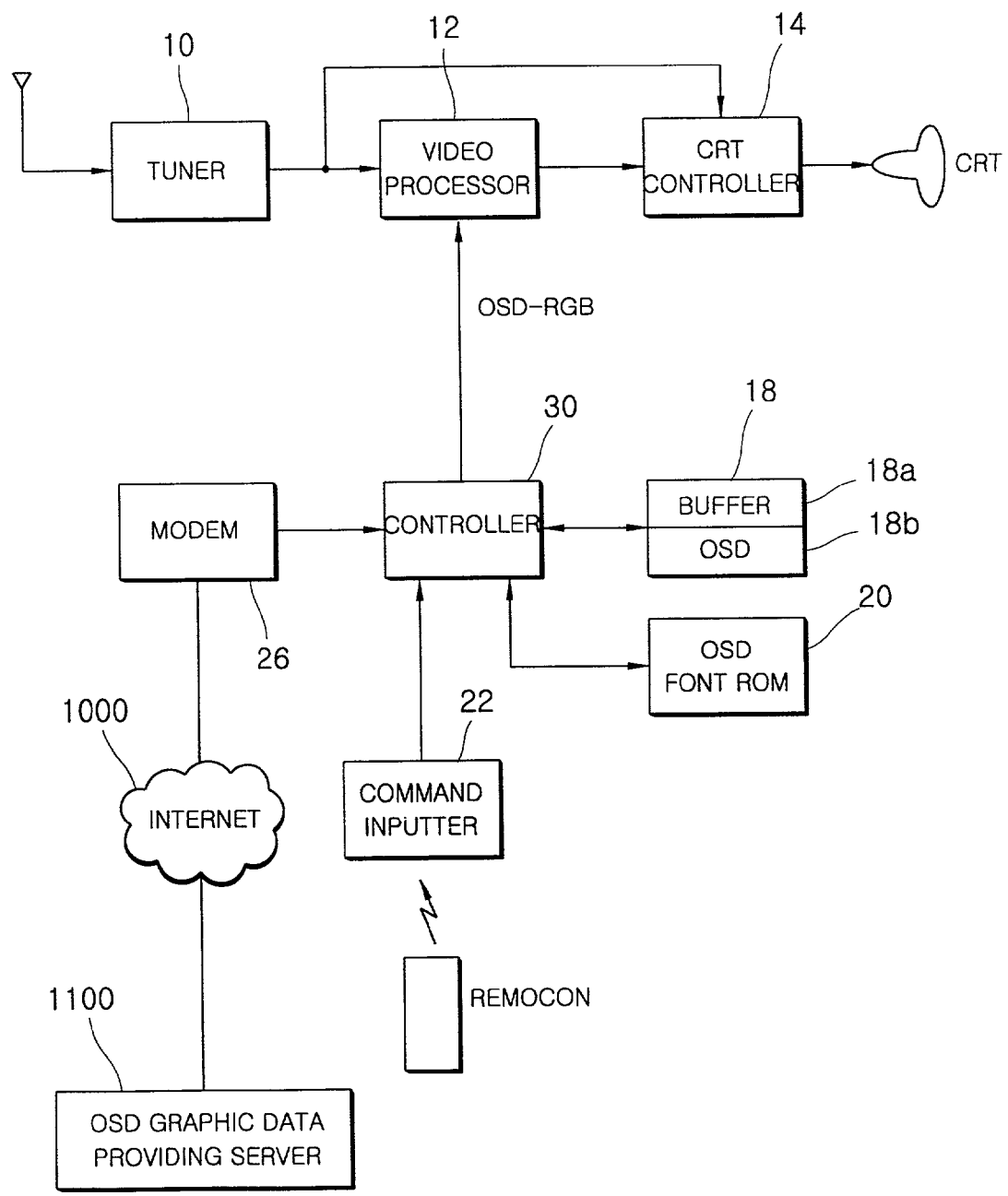
FIG. 4 is a block diagram showing a web television receiver set having variable OSD graphic data according to the present invention.

FIG. 4 is a block diagram showing a web television receiver set having variable OSD graphic data according to the present invention. The web television receiver set of FIG. 4 has no data detector in comparison with the television receiver set of FIG. 1. However, the web television receiver set of FIG. 4 includes a modem 26 and a controller 30 for accessing the Internet 1000.

That is, the web television receiver set accesses the Internet via the modem 26 and then accesses an OSD graphic data providing server 1100. Then, the controller 30 downloads desired OSD graphic data from the accessed OSD graphic data providing server 1100 via the modem 26 and controls the downloaded OSD graphic data to be stored in the OSD region 18b. Here, it is preferable that the OSD graphic data providing server 1100 is a website run by a manufacturer that makes the web television receiver set.

Figure 5:
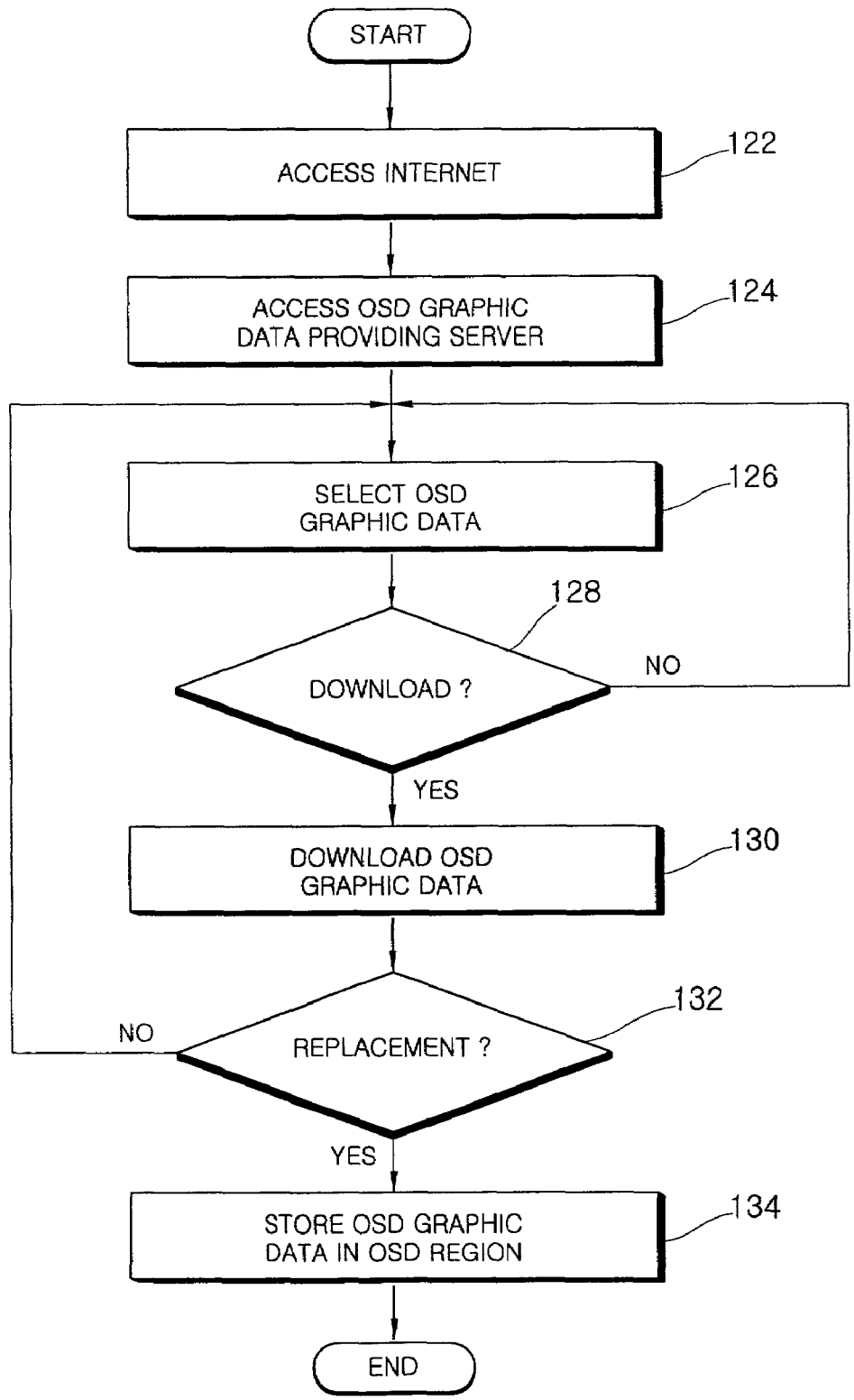
FIG. 5 is a flowchart explaining a program for downloading OSD graphic data in a web television receiver set according to the present invention.

FIG. 5 is a flowchart explaining a program for downloading OSD graphic data in a web television receiver set according to the present invention.

In FIG. 5, if an Internet access command is input via the command inputter 22, the controller 30 performs an Internet access operation via the modem 26 (operation 122). If an Internet access command has been input, the controller 30 performs an access to the OSD graphic data providing server 1100 via a selected web browser (operation 124).

Then, OSD graphic data is selected from a home page or a plurality of home pages of the accessed OSD graphic data providing server 1100 (operation 126), and it is checked whether a downloading command for the selected OSD graphic data is input (operation 128). For instance, a web page is displayed so that the user can select a file for download via ftp by clicking on a link or the controller makes an ftp connection to an ftp server and generates a display representing the files in a directory of the ftp server so that the user can select one for downloading. The selection of the OSD graphic data may be done using the remote controller. If a downloading command exists, the selected OSD graphic data is downloaded and then temporarily stored in the buffer region 18a of the memory 18 (operation 130). If a downloading command does not exist, the program returns to operation 126 for the selection of OSD graphic data from the home page of the accessed OSD graphic data providing server 1100.

The controller 30 checks whether a replacement command is input via the command inputter 22 (operation 132). If the replacement command has been input, the OSD graphic data stored in the buffer region 18a is stored in the OSD region 18b (operation 134) and then the controller 30 completes the program. If the replacement command has not been input in operation 132, the controller 24 returns to operation 126, to then check whether an OSD graphic data downloading command (signal) is input after OSD graphic data has been selected in operation 126.

Figure 6:
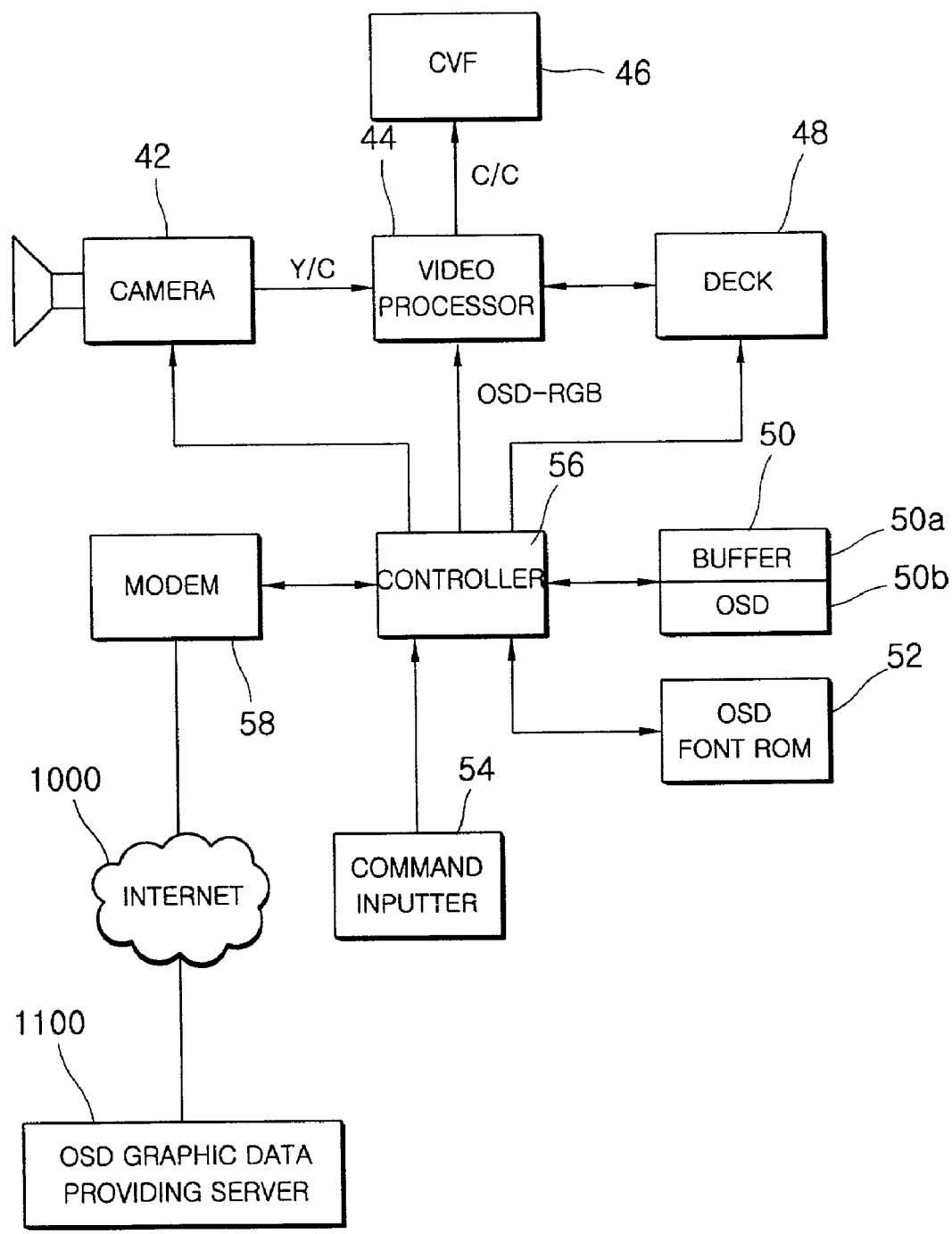
FIG. 6 is a block diagram showing a web video camera apparatus having variable OSD graphic data according to the present invention.

FIG. 6 is a block diagram showing a web video camera apparatus having variable OSD graphic data according to the present invention. The web video camera of FIG. 6 includes a camera portion 42, a video processor 44, a viewfinder 46, a deck 48, a memory 50, an OSD font ROM 52, a command inputter 54, a controller 56 and a modem 58.

The camera portion 42 includes a lens and a CCD type solid state image pickup device, processing the picked-up image into a digital signal to accordingly output luminance and chrominance signals.

The video processor 44 processes the luminance and chrominance signals provided from the camera portion 42, and overlaps them with an OSD-RGB signal provided from the controller 56, to thereby provide the resultant signal to be displayed on the viewfinder 46. Also, the luminance and chrominance signals overlapped with the OSD-RGB signal are FM-modulated and the FM modulated result is provided to the deck 48 to be recorded on a video tape. A reproduced signal provided from the deck 48 is input and FM-modulated, to then be supplied to the viewfinder 46.

The viewfinder 46 may be a color viewfinder (CVF), and if so, may be a CRT viewfinder or a color liquid crystal display (LCD) viewfinder. The video processor 44 processes the luminance and chrominance signals for display on the CRT or the LCD.

The memory 50 includes a RAM, SRAM or EEPROM, which includes a buffer region 50a and an OSD region 50b. The buffer region 50a comprises a DRAM, in which the received OSD graphic data is temporarily stored. The OSD graphic data stored in the buffer region 50a is stored in the OSD region 50b according to a replacement command. It is preferable that the OSD region 50b comprises an EEPROM. The data stored in the OSD region 50b is provided to the system as the OSD graphic data at a user mode.

The OSD font ROM 52 is substantially the same as an existing OSD font ROM, which can be provided as a basic option.

The command inputter 54 includes a key input device on a front panel of the set, or a remote controller receiver for receiving a remote control signal.

The controller 56 includes a microcomputer and peripheral circuits therefor. The controller 56 controls the camera portion 42, the video processor 44, and the deck 48, and accesses the Internet 1000 via the modem 58.

That is, the web video camera accesses the Internet 1000 via the modem 26 and then accesses the OSD graphic data providing server 1100. Accordingly, desired OSD graphic data is downloaded from the accessed OSD graphic data providing server 1100 and the downloaded OSD graphic data is stored in the OSD region 50b in a similar fashion as that done in the web television receiver set shown in FIG. 4.

The web video camera of FIG. 6 executes the same program as the downloading program of FIG. 5 and downloads OSD graphic data from the OSD graphic data providing server 1100. Also, the same program as the display program of FIG. 3 is executed and the controller 56 reads the downloaded OSD graphic data at the user mode, to thereby generate an OSD-RGB signal.

Thus, the web video camera can process the picked-up image on a variety of OSD graphic images as a background image and thus, the OSD graphic data from the OSD graphic data server can be used as the background graphic data to edit the picked-up image. As a result, a more various image editing can be performed.

As described above, the video apparatus according to the present invention receives or downloads OSD graphic data from an external OSD graphic data source, to thereby enable a user to alter the OSD displays data. Accordingly, a variety of OSD displays can be performed.

Other apparatuses may be used as well, which employ the present invention. For example, an MP3 player (portable digital audio player) may have a display function and a font ROM, and also, it may be possible to download the OSD graphic data from a personal computer to the MP3 player. It is noted that other apparatuses which do not specifically have a display function may employ the present invention. For example, a video cassette recorder (VCR) or a set-top may utilize the present invention.

The present invention has been described with respect to the preferred embodiments thereof. However, it should be understood that a person skilled in the art can modify and vary the present invention within the technical scope of the present invention without departing off from the technical concept and spirit of the present invention claimed in the appended claims.

What is claimed is:

1. An apparatus comprising:

an on screen data (OSD) graphic data receiver which receives OSD graphic data from an external OSD graphic data source; and a processor which processes the OSD graphic data, wherein the OSD graphic data receiver further comprises:

a memory which stores the OSD graphic data from the external OSD graphic data source; and a controller which stores the OSD graphic data in the memory in response to an OSD graphic data storage signal and reads the OSD graphic data from the memory in response to an OSD display signal, to supply the read OSD graphic data to the processor, and wherein the memory comprises:

a buffer region; and an OSD region; and wherein the controller stores the OSD graphic data in the buffer region and stores the OSD graphic data from the buffer region in the OSD region in response to a replacement signal received from a command in putter operated by a user, and supplies the OSD graphic data stored in the OSD region to the processor in response to the OSD display signal.

2. The apparatus of claim 1, wherein the OSD graphic data receiver selects the OSD graphic data from among a plurality of different types of OSD graphic data located at the external OSD graphic data source for display.

3. The apparatus of claim 1, wherein the OSD graphic data receiver comprises:
a broadcasting television receiver, which receives a broadcasting signal including the OSD graphic data, to output a composite video signal including the OSD graphic data; and
a data detector which detects the OSD graphic data from the composite video signal;
wherein the processor comprises a video processor which processes the composite video signal and the OSD graphic data detected by the data detector, to output a display video signal including the OSD graphic data.

4. The apparatus of claim 3, wherein the data detector detects the OSD graphic data by detecting data loaded in a line of a vertical blanking interval of the broadcasting signal.

5. The apparatus of claim 4, wherein the OSD graphic data is provided in the broadcasting signal from a broadcasting station in an additional information format of a closed caption mode.

6. The apparatus of claim 1, wherein the OSD graphic data receiver further comprises a cathode ray tube controller which detects a sync signal from the composite video signal and displays the display video signal in accordance with the sync signal.

7. The apparatus of claim 1, wherein:
the buffer region comprises a volatile memory; and
the OSD region comprises a non-volatile memory.

8. An apparatus comprising:
an on screen data (OSD) graphic data receiver which receives OSD graphic data from an external OSD graphic data source;
a processor which processes the OSD graphic data,
wherein the OSD graphic data receiver further comprises:
a memory which stores the OSD graphic data from the external OSD graphic data source; and
a controller which stores the OSD graphic data in the memory in response to an OSD graphic data storage signal and reads the OSD graphic data from the memory in response to an OSD display signal, to supply the read OSD graphic data to the processor; and
an OSD font ROM which permanently stores fixed OSD graphic data, wherein the controller supplies the OSD graphic data from the memory to the processor in a user mode and supplies the fixed OSD graphic data to the processor in a non user mode.

9. The apparatus of claim 1, further comprising an OSD font ROM which permanently stores fixed OSD graphic data, wherein the controller supplies the OSD graphic data from the OSD region to the processor in a user mode and supplies the fixed OSD graphic data to the processor in a non user mode.

10. The apparatus of claim 1, wherein the OSD graphic data is received from a broadcasting station in an RGB pattern and stored in the OSD region in the RGB pattern.

11. The apparatus of claim 1, wherein the OSD graphic data is received from a broadcasting station in a binary code or a hexadecimal code form, converted into an RGB pattern by the controller and stored in the OSD region in the RGB pattern.

12. An apparatus comprising:
an on screen data (OSD) graphic data receiver which receives OSD graphic data from an external OSD graphic data source; and
a processor which processes the OSD graphic data,
wherein the OSD graphic data receiver comprises:
a tuner which receives a television signal, to output a composite video signal;
a modem connected to a communication network, which downloads the OSD graphic data from an external OSD graphic data source;
a video processor which processes the composite video signal and the OSD graphic data downloaded by the modem, to output a display video signal including the OSD graphic data,
a memory which stores the OSD graphic data downloaded by the modem; and
a controller which stores the OSD graphic data downloaded by the modem in the memory in response to an OSD graphic data storage signal and reads the OSD graphic data from the memory in response to an OSD display signal, to supply the OSD graphic data to the video processor,
wherein the memory comprises:
a buffer region; and
an OSD region; and
wherein the controller stores the OSD graphic data in the buffer region and stores the OSD graphic data from the buffer region in the OSD region in response to a replacement signal received from a command inputter operated by a user, and supplies the OSD graphic data stored in the OSD region to the video processor in response to the OSD display signal.

13. The apparatus of claim 12, wherein the OSD graphic data receiver further comprises a cathode ray tube controller which detects a sync signal from the composite video signal and displays the display video signal in accordance with the sync signal.

14. The apparatus of claim 12, wherein the external OSD graphic data source is an OSD graphic data providing server.

15. The apparatus of claim 12, wherein the external OSD graphic data source is an OSD graphic data providing server, and the controller downloads the OSD graphic data via the modem from a home page of the OSD graphic data providing server.

16. The apparatus of claim 12, wherein:
the buffer region comprises a volatile memory; and
the OSD region comprises a non-volatile memory.

17. An apparatus comprising:
an on screen data (OSD) graphic data receiver which receives OSD graphic data from an external OSD graphic data source;
a processor which processes the OSD graphic data,
wherein the OSD graphic data receiver comprises:
a tuner which receives a television signal, to output a composite video signal;
a modem connected to a communication network, which downloads the OSD graphic data from an external OSD graphic data source;
a video processor which processes the composite video signal and the OSD graphic data downloaded by the modem, to output a display video signal including the OSD graphic data,
a memory which stores the OSD graphic data downloaded by the modem; and
a controller which stores the OSD graphic data downloaded by the modem in the memory in response to an OSD graphic data storage signal and reads the OSD graphic data from the memory in response to an OSD display signal, to supply the OSD graphic data to the video processor; and
an OSD font ROM which permanently stores fixed OSD graphic data, wherein the controller supplies the OSD graphic data from the memory to the video processor in a user mode and supplies the fixed OSD graphic data to the video processor in a non user mode.

18. The apparatus of claim 12, further comprising an OSD font ROM which permanently stores fixed OSD graphic data, wherein the controller supplies the OSD graphic data from the OSD region to the video processor in a user mode and supplies the fixed OSD graphic data to the video processor in a non user mode.

19. An apparatus comprising:
an on screen data (OSD) graphic data receiver which receives OSD graphic data from an external OSD graphic data source; and
a processor which processes the OSD graphic data,
wherein the OSD graphic data receiver comprises:
a camera which picks up an image of an object, to output a composite video signal;
a modem connected to a communication network, which downloads the OSD graphic data from an external OSD graphic data source;
a video processor which processes the composite video signal and the OSD graphic data downloaded by the modem, to output a display video signal including the OSD graphic data,
a memory which stores the OSD graphic data downloaded by the modem; and
a controller which stores the OSD graphic data downloaded by the modem in the memory in response to an OSD graphic data storage signal and reads the OSD graphic data from the memory in response to an OSD display signal, to supply the OSD graphic data to the video processor,
wherein the memory comprises:
a buffer region; and
an OSD region; and
wherein the controller stores the OSD graphic data in the buffer region and stores the OSD graphic data from the buffer region in the OSD region in response to a replacement signal received from a command inputter operated by a user, and supplies the OSD graphic data stored in the OSD region to the video processor in response to the OSD display signal.

20. The apparatus of claim 19, wherein the external OSD graphic data source is an OSD graphic data providing server.

21. The apparatus of claim 19, wherein the external OSD graphic data source is an OSD graphic data providing server, and the controller downloads the OSD graphic data via the modem from a home page of the OSD graphic data providing server.

22. The apparatus of claim 19, wherein:
the buffer region comprises a volatile memory; and
the OSD region comprises a non-volatile memory.

23. An apparatus comprising:
an on screen data (OSD) graphic data receiver which receives OSD graphic data from an external OSD graphic data source;
a processor which processes the OSD graphic data,
wherein the OSD graphic data receiver comprises:
a camera which picks up an image of an object, to output a composite video signal,
a modem connected to a communication network, which downloads the OSD graphic data from an external OSD graphic data source,
a video processor which processes the composite video signal and the OSD graphic data downloaded by the modem, to output a display video signal including the OSD graphic data, a memory which stores the OSD graphic data downloaded by the modem, and
a controller which stores the OSD graphic data downloaded by the modem in the memory in response to an OSD graphic data storage signal and reads the OSD graphic data from the memory in response to an OSD display signal, to supply the OSD graphic data to the video processor; and
an OSD font ROM which permanently stores fixed OSD graphic data, wherein the controller supplies the OSD graphic data from the memory to the video processor in a user mode and supplies the fixed OSD graphic data to the video processor in a non user mode.

24. The apparatus of claim 19, further comprising an OSD font ROM which permanently stores fixed OSD graphic data, wherein the controller supplies the OSD graphic data from the OSD region to the video processor in a user mode and supplies the fixed OSD graphic data to the video processor in a non user mode.

25. The apparatus of claim 19, further comprising a deck which records the display video signal on a recording medium.

26. The apparatus of claim 19, wherein:
the OSD graphic data is supplied to the video processor as an OSD-RGB signal;
the video processor processes luminance and chrominance signals of the composite video signal, overlaps the processed luminance and chrominance signals with the OSD-RGB signal, and FM-modulates the overlapped signal; and further comprising:
a deck which records the FM-modulated overlapped signal on a recording medium.

27. A television receiver set comprising:
a receiver receiving a television signal, to output a composite video signal;
a video processor processing the composite video signal and overlapping the processed composite video signal and an on screen display (OSD) graphic signal, to output a display video signal;
a data detector detecting OSD graphic data from the composite video signal;
a memory storing the detected OSD graphic data; and
a controller storing the OSD graphic data detected from the data detector in the memory in response to an OSD graphic data storage signal and reading the OSD graphic data from the memory in response to an OSD display signal, to supply the read OSD graphic data to the video processor as the OSD graphic signal,
wherein the memory comprises:
a buffer region; and
an OSD region; and
wherein the controller stores the OSD graphic data in the buffer region and stores the OSD graphic data from the buffer region in the OSD region in response to a replacement signal received from a command in putter operated by a user, and supplies the OSD graphic data stored in the OSD region to the video processor in response to the OSD display signal.

28. A web television receiver set comprising:
a receiver receiving a television signal, to output a composite video signal;
a video processor processing the composite video signal and overlapping the processed composite video signal and an on screen display (OSD) graphic signal, to output a display video signal;

a modem connected to a communication network, downloading OSD graphic data from an external OSD graphic data source;
a memory storing the OSD graphic data downloaded via the modem; and
a controller storing the OSD graphic data downloaded via the modem in the memory in response to an OSD graphic data downloading signal and reading the OSD graphic data from the memory in response to an OSD display signal, to supply the read OSD graphic data to the video processor as the OSD graphic signal,
wherein the memory comprises:
a buffer region; and
an OSD region; and
wherein the controller stores the OSD graphic data in the buffer region and stores the OSD graphic data from the buffer region in the OSD region in response to a replacement signal received from a command inputter operated by a user, and supplies the OSD graphic data stored in the OSD region to the video processor in response to the OSD display signal.

29. A web video camera apparatus comprising:
a camera picking up an image, to output a video signal;
a video processor processing the video signal and overlapping the processed video signal and an on screen display (OSD) graphic signal, to output a display video signal;
a modem connected to a communication network, downloading OSD graphic data from an external OSD graphic data source;
a memory storing the OSD graphic data downloaded via the modem;
a deck recording the display video signal on a video recording medium; and
a controller storing the OSD graphic data downloaded via the modem in the memory in response to an OSD graphic data downloading signal and reading the OSD graphic data from the memory in response to an OSD display signal, to supply the read OSD graphic data to the video processor as the OSD graphic signal,
wherein the memory comprises:
a buffer region; and
an OSD region; and
wherein the controller stores the OSD graphic data in the buffer region and stores the OSD graphic data from the buffer region in the OSD region in response to a replacement signal received from a command inputter operated by a user, and supplies the OSD graphic data stored in the OSD region to the video processor in response to the OSD display signal.

30. An MP3 player comprising:
a receiver receiving an on screen display (OSD) graphic signal from an external source;
a processor processing the OSD graphic signal, to output a display video signal;
a memory storing the OSD graphic data; and
a controller storing the OSD graphic data in the memory in response to an OSD graphic data storage signal and reading the OSD graphic data from the memory in response to an OSD display signal, to supply the read OSD graphic data to the processor as the OSD graphic signal,
wherein the memory comprises:
a buffer region; and
an OSD region; and
wherein the controller stores the OSD graphic data in the buffer region and stores the OSD graphic data from the buffer region in the OSD region in response to a replacement signal received from a command inputter operated by a user, and supplies the OSD graphic data stored in the OSD region to the processor in response to the OSD display signal.

31. The MP3 player of claim 30, wherein the external source is a personal computer.

32. A method of displaying on screen display (OSD) graphic data comprising:
receiving the OSD graphic data in a device from an external OSD graphic data source; and
displaying the OSD graphic data in a first mode,
wherein the receiving comprises:
storing the OSD graphic data received from the external OSD graphic data source in a buffer region in response to an OSD graphic data receiving input signal from the user; and
storing the OSD graphic data from the buffer region in an OSD region in response to a replacement signal from the user.

33. The method of claim 32, wherein the external OSD graphic data source is a broadcasting station and the receiving further comprises receiving the OSD graphic data in a television signal from the broadcasting station.

34. The method of claim 33, wherein the displaying comprises:
overlapping the OSD graphic data with a television signal received from the broadcasting station; and
displaying the overlapped signal.

35. The method of claim 32, wherein the external OSD graphic data source is an OSD graphic data providing server and the receiving further comprises receiving the OSD graphic data from the OSD graphic data providing server through a communication network.

36. The method of claim 35, wherein the displaying comprises:
overlapping the OSD graphic data with a television signal received from broadcasting station; and
displaying the overlapped signal.

37. The method of claim 35, wherein the displaying comprises:
overlapping the OSD graphic data with an image signal indicative of an image object received through a lens;, and
displaying the overlapped signal.

38. The method of claim 32, wherein the device comprises a font ROM having fixed OSD graphic data, the method comprising:
determining whether the device is in an OSD display mode;
determining whether the device is in a user mode or a non user mode if the device is in the OSD display mode; and
reading and displaying the OSD graphic data from the buffer region if the device is in the user mode and the fixed OSD graphic data from the font ROM if the device is in the non user mode.

* * * * *

UNITED STATES PATENT AND TRADEMARK OFFICE
CERTIFICATE OF CORRECTION

PATENT NO. : 7,047,552 B2  
APPLICATION NO. : 09/780615  
DATED : May 16, 2006  
INVENTOR(S) : Min-hyung Chung et al.

Page 1 of 1

It is certified that error appears in the above-identified patent and that said Letters Patent is hereby corrected as shown below:

Column 6, Line 60, change "in putter" to --inputter--.

Column 10, Line 57, change "in putter" to --inputter--.

Column 12, Line 49, change "lens;," to --lens;--.

Signed and Sealed this

Sixteenth Day of January, 2007

JON W. DUDAS  
*Director of the United States Patent and Trademark Office*